United States Patent
Deeth et al.

(10) Patent No.: US 8,664,347 B2
(45) Date of Patent: Mar. 4, 2014

(54) REACTIVE AMINE-FUNCTIONAL SILICONE-POLYETHER BLOCK COPOLYMERS

(75) Inventors: Brian P. Deeth, Midland, MI (US); John Joseph Kennan, Midland, MI (US); Kevin Dale Lewis, Sanford, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 13/639,234

(22) PCT Filed: Apr. 6, 2011

(86) PCT No.: PCT/US2011/031322
§ 371 (c)(1),
(2), (4) Date: Oct. 4, 2012

(87) PCT Pub. No.: WO2011/127108
PCT Pub. Date: Oct. 13, 2011

(65) Prior Publication Data
US 2013/0030131 A1    Jan. 31, 2013

Related U.S. Application Data

(60) Provisional application No. 61/321,306, filed on Apr. 6, 2010.

(51) Int. Cl.
*C08G 77/04* (2006.01)
*C08G 77/42* (2006.01)
*C08F 283/12* (2006.01)

(52) U.S. Cl.
USPC .............................. 528/25; 525/474; 525/476

(58) Field of Classification Search
USPC ..................... 528/25; 525/474, 476, 477, 479
See application file for complete search history.

(56) References Cited

U.S. PATENT DOCUMENTS

| 8,013,097 B2 | 9/2011 | Kennan et al. |
| 2011/0200548 A1 | 8/2011 | Johnson et al. |

FOREIGN PATENT DOCUMENTS

| JP | 05310944 A | * 11/1993 | ............ C08F 290/00 |
| JP | 09183854 | 7/1997 | |
| JP | 03269570 | 9/2002 | |
| WO | WO 2008127519 A1 | * 10/2008 | |

* cited by examiner

*Primary Examiner* — Randy Gulakowski
*Assistant Examiner* — Christopher M Rodd
(74) *Attorney, Agent, or Firm* — Alan Zombeck (57) ABSTRACT

Silicone-polyether block copolymers are disclosed, having the average formula: $R^4R^1{}_2Si(OR^5{}_2Si)_m\{[R^2O(C_qH_{2q}O)_pR^2R^1{}_2Si(OR^5{}_2Si)_k]_nR^2O(C_qH_{2q}O)_pR^2R^1{}_2Si\}_mOSiR^1{}_2R^4$ wherein $R^1$ is $C_1$-$C_{10}$ hydrocarbyl; $R^2$ is $C_1$-$C_{10}$ hydrocarbylene; $R^3$ is $R^1$ or H; $R^4$ is —$R^2$—$NR^3{}_2$ or —$R^2$—$NR^3$—$R^2$—$NR^3{}_2$; $R^5$ is $R^1$ or $R^4$; h is 1 to 100; k is 2 to 500; m is 2 to 500; n is 0 to 30; p is 2 to 120; and q is 2 to 4. The silicone-polyether block copolymers comprise two terminal amine functionalities and may comprise varying degrees of pendent amine functionality. In a method for synthesizing linear silicone-polyether block copolymers of the above formula, a reaction mixture is formed by combining a polyether, an organosilicon component, an endblocking agent, and a catalyst. Thereupon, the reaction mixture is heated to produce a silicone-polyether block copolymer having at least one pendent amine functionality and a number-average molecular weight from 2000 to 500,000. Also disclosed are silicone-polyether block copolymers prepared according to the above method.

18 Claims, 2 Drawing Sheets

REACTIVE AMINE-FUNCTIONAL SILICONE-POLYETHER BLOCK COPOLYMERS

CROSS REFERENCE TO RELATED APPLICATIONS

This application is a U.S. national stage filing under 35 U.S.C. §371 of PCT Application No. PCT/US11/031,322 filed on Apr. 6, 2011, currently pending, which claims the benefit of U.S. Provisional Patent Application No. 61/321,306 filed Apr. 6, 2010 under 35 U.S.C. §119 (e). PCT Application No. PCT/US11/031,322 and U.S. Provisional Patent Application No. 61/321,306 are hereby incorporated by reference.

TECHNICAL FIELD

The present invention relates generally to polysiloxanes and in particular to reactive amine-functional silicone-polyether block copolymers and methods for their preparation.

BACKGROUND

Certain amine-functional silicones have been used as components of hydrophilic treatments for softening fibrous substrates such as textiles, hair, and tissue. In addition to the silicone block, suitable molecules for such hydrophilic treatments may include, for example, amine groups to facilitate adsorption onto the substrate surface.

Many problems commonly are associated with amine-functional silicones used for treating textiles, particularly, the combination of yellowing and the tendency of the treated materials becoming increasingly hydrophobic over time. The chemical nature of the amine functionality to oxidize results in the yellowing. The reorganization or redistribution of the generally hydrophobic silicone chains results in the loss of hydrophilicity of the treated substrates. Thus, ongoing efforts have involved modifying amine-functional silicones by adding hydrophilic groups to siloxanes and by altering or reducing amine content to reduce yellowing.

Amine functionality in silicone polymers can be imparted in terminal positions (at the end of the polymer chain), in pendent positions (from functional groups attached to silicon atoms in the middle of the polymer chain), or both. A polymer with only terminal amine groups represents the absolute minimum amount of amine that may be present while guaranteeing that each and every polymer chain has the essential ability to attach to the surface of the substrate. The terminal amine also serves as a functionality from where larger or diverse telechelic polymers may be synthesized. One potential drawback is dependence of the amine content of the polymer relative to the molecular weight of the overall polymer. Pendent amine groups allow for the overall amine content of the polymer to be tuned. However, statistics dictate the distribution of the amine functionality among the chains and can be problematic in cases where low amine content is targeted and can result in some polymer chains lacking the functionality. A combination of both terminal and pendent amine groups would allow for the inclusion of amine functionality on each and every polymer chain while also allowing the overall amine content to be tuned for the polymers. No methods currently exist for synthesizing silicone-polyether block copolymers that include both terminal-amine groups and pendent-amine groups at a consistently reproducible level.

For example, in the approach disclosed in JP09183854 and JP03269570, a copolymer is prepared by first making a block copolymer from Si—H-terminal polydimethylsiloxane and a methallyl-terminal polyether. The resulting copolymer is equilibrated with a variety of functional siloxanes, such as an aminosiloxane, to make a silicone-polyether block copolymer having pendent functional groups, such as amine groups. In this sense, "equilibration" involves allowing the reaction to progress until the distribution of pendent functional groups within the copolymer is sufficiently random. No amine-functional endblocking agent is present in the reaction mixture; hence, the copolymers do not comprise terminal amine groups.

Several problems arise with respect to the scheme in JP09183854 and JP03269570. In the first step, for example, molecular-weight control is accomplished only by precisely controlling the ratio of olefin to Si—H. The success of the hydrosilylation reaction is sometimes dependent on a significant amount of solvent being added to make the silicone compatible with the polyether to enable efficient reaction. In some cases, significant amounts of Pt catalyst are added to drive the reaction to occur at an appreciable rate. In the second step, a long reaction time may be necessary to ensure complete randomization of the amine groups. Moreover, complete randomization of the amine groups can be difficult to discern from the reaction mixture. And because the amine groups are pendent, the resulting polymers exhibit a statistical distribution of amine groups across all the polymer chains that are formed. Thus, when the reaction mixture has a low amine concentration, a significant portion of the polymer chains would be expected to contain no amine functionality.

In WO 2008/127519, an epoxy-terminal silicone-polyether copolymer is synthesized by a slightly different route. Particularly, a Si—H-terminal polydimethylsiloxane is reacted with a polyether possessing hydrosilylatable endgroups (typically allyl or methallyl) polyether and an allyl-functional epoxide. The epoxy, which commonly is allyl glycidyl ether but may also be vinylcyclohexene oxide, provides a reactive site for the addition of a primary or secondary amine. This reaction can be conducted without a solvent under some conditions, depending primarily on the molecular weights of the polydimethylsiloxane and polyether. In the simplest form, this approach permits amine incorporation, but onto the chain ends only. But advantageously, nearly all the copolymer chains contain terminal-amine functionality, and the number of non-amine-functional chains is minimized. If one was to use a primary amine or secondary diamine in the reaction with the epoxy-terminal silicone-polyether copolymer, a chain-extended variant could be obtained also possessing tertiary amine groups along the chain.

Despite its advantages, the approach in WO 2008/127519 also has many undesirable attributes. First, precise control of the ratio of the Si—H-functional polymer and the unsaturated polyether are required to maintain control of the molecular weight of the initial intermediate. Second, because the approach requires a minimum of three processing steps, manufacturing costs can be high relative to the markets the eventual product could serve. Third, the use of solvent, which is often required, reduces process throughput and efficiency. Fourth, reagents such as allyl glycidyl ether and vinyl cyclohexene oxide can raise health or environmental concerns, particularly in light of regulations that limit the free-epoxide content in the final commercial product. Isomerization or hydrogenation of the epoxide double bond can lead to residual epoxides in excess of the regulated amount. Fifth, when substantial excesses of amine are required to drive the amination of the epoxide, unreacted amine must be removed in additional processing steps. Residual volatile amines typically cause undesirable odors in products, and low molecular-weight amines can be hazardous to aquatic life. Sixth, because each polymer chain contains the amine at only the two endgroups or junctions of the original epoxy-terminal silicone-polyether copolymer, the molar-fractional amine content of the copolymer decreases as molecular weight increases.

Therefore, there remains a need for silicone-polyether block copolymers that are functionalized with terminal-amine groups and, optionally, with one or more pendent-amine groups. There remains a further need for reliable and reproducible synthetic methods that avoid the above disadvantages of existing methods for incorporating limited amine functionality into silicone-polyether block copolymers.

SUMMARY

In one embodiment, silicone-polyether block copolymers are disclosed, the average formula of which may be represented as formula (I):

(I)

wherein $R^1$ is $C_1$-$C_{10}$ hydrocarbyl; $R^2$ is $C_1$-$C_{10}$ hydrocarbylene; $R^4$ is —$R^2$—$NR^3_2$ or —$R^2$—$NR^3$—$R^2$—$NR^3_2$, wherein $R^3$ is $R^1$ or H; $R^5$ is $R^1$ or $R^4$; h is from 1 to 100; k is from 2 to 500; m is from 2 to 500; n is from 0 to 30; p is from 2 to 120; and q is from 2 to 4. In some embodiments, the silicone-polyether block copolymers may comprise per molecule an average of at least one $R^5$ group for which $R^5$ is $R^4$. As such, the silicone-polyether block copolymers comprise terminal amine functionality on both ends and may comprise varying degrees of pendent amine functionality. The silicone-polyether block copolymers alternatively may be described with respect to an amine-terminated $(AB)_h$-type structure, where A represents a polyether block, B represents a silicone block, and h is the number of repeating units.

In another embodiment, a method for synthesizing linear silicone-polyether block copolymers is described, whereby a silicone-polyether $(AB)_h$ block copolymer is synthesized by condensation alone or by simultaneous equilibration and condensation. The method may comprise forming a reaction mixture by combining:

(a) a polyether having the average formula (II):

(II);

(b) an organosilicon component selected from the group consisting of (i) at least one cyclosiloxane having the formula $(R^5_2SiO)_t$, (ii) at least one linear siloxane having the average formula $Z(R^5_2SiO)_vSiR^5_2Z$, (iii) at least one silane having the formula $R^5_2Si(OR^3)_2$, and (iv) an organosilicon mixture comprising at least two organosilicon components selected from (b)(i), (b)(ii), and (b)(iii), and (v) an organosilicon mixture comprising water and at least one organosilicon component selected from (b)(i), (b)(ii), and (b)(iii);

(c) an endblocking agent selected from (i) at least one sila-aza-cyclopentane having the formula (ii) at least one silane having the formula $R^4R^5_2Si(OR^3)$, (iii) at least one siloxane having the formula $R^4R^5_2SiO(R^5_2SiO)_wSiR^5_3$, and (iv) an endblocker mixture comprising at least two endblocking agents selected from (c)(i), (c)(ii), and (c)(iii); and (d) at least one catalyst.

In the formulas above, $R^1$ is $C_1$-$C_{10}$ hydrocarbyl; $R^2$ is $C_1$-$C_{10}$ hydrocarbylene; $R^3$ is $R^1$ or H; $R^4$ is —$R^2$—$NR^3_2$ or —$R^2$—$NR^3$—$R^2$—$NR^3_2$; $R^5$ is $R^1$ or $R^4$; $R^6$ is —$CH_3$ or H; Z is hydroxyl or a hydrolysable group such as, for example, alkoxyl, alkoxysilyl, hydridosilyl, acyloxysilyl, halosilyl, or silazanyl; m is from 2 to 500; n is from 0 to 30; p is from 2 to 120; q is from 2 to 4; t is from 3 to 8; v is from 1 to 50; w is from 0 to 200; the mole ratio of the organosilicon component (b) to the polyether (a) is from about 1.01 to about 2; and the mole ratio of the endblocking agent (c) to the polyether (a) is from about 0.02 to about 2.

Thereupon, the reaction mixture is heated at a temperature from about 40° C. to about 250° C., alternatively from about 50° C. to about 220° C., alternatively from about 60° C. to about 150° C., for a sufficient amount of time to produce a silicone-polyether block copolymer having a number-average molecular weight from 2000 to 500,000, alternatively from 5000 to 300,000, alternatively from 7000 to 200,000, provided the silicone-polyether block copolymer comprises per molecule an average of at least one $R^5$ group for which $R^5$ is $R^4$.

In other embodiments, silicone-polyether block copolymers prepared according to one or more embodiments of the methods described herein are disclosed.

These and additional features and advantages of the present invention will become apparent in the course of the following detailed description.

BRIEF DESCRIPTION OF THE DRAWINGS

The following detailed description of specific embodiments of the present disclosure can be best understood when read in conjunction with the following drawings, in which.

DETAILED DESCRIPTION

Features and advantages of the invention will now be described with occasional reference to specific embodiments. However, the invention may be embodied in different forms and should not be construed as limited to the embodiments set forth herein. Rather, these embodiments are provided so that this disclosure will be thorough and complete and will fully convey the scope of the invention to those skilled in the art.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

As used in the specification and appended claims, the terms "R group" and "R groups" are intended, unless the context clearly indicates otherwise, to include all forms of "R" described herein (R, $R^1$, $R^2$, $R^3$, $R^4$, etc.) without limitation.

The term "independently selected from," as used in the specification and appended claims, is intended to mean that the referenced groups can be the same, different, or a mixture thereof, unless the context clearly indicates otherwise. Thus, under this definition, the phrase "$X^1$, $X^2$, and $X^3$ are independently selected from noble gases" would include, for example, the scenarios where $X^1$, $X^2$, and $X^3$ are all the same, where $X^1$, $X^2$, and $X^3$ are all different, and where $X^1$ and $X^2$ are the same but $X^3$ is different. Unless otherwise indicated, every instance of an R group or variable in a general formula is to be regarded as independently selected from among the possible options for the R group or variable, without regard to other explicit or implicit occurrences of the same R group or variable in the general formula.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. One of ordinary skill in the art will understand that any numerical values inherently contain certain errors attributable to the measurement techniques used to ascertain the values.

According to various embodiments, silicone-polyether block copolymers are disclosed that have the average formula (I):

(I), wherein $R^1$ is $C_1$-$C_{10}$ hydrocarbyl; $R^2$ is $C_1$-$C_{10}$ hydrocarbylene; $R^4$ is —$R^2$—$NR^3_2$ or —$R^2$—$NR^3$—$R^2$—$NR^3_2$, wherein $R^3$ is $R^1$ or H; $R^5$ is $R^1$ or $R^4$; h is an integer from 1 to 100, alternatively from 1 to 30, alternatively from 1 to 10; k is from 2 to 500, alternatively from 10 to 200, alternatively from 20 to 150; m is from 2 to 500, alternatively from 10 to 200, alternatively from 20 to 100; n is from 0 to 30, alternatively from 0 to 20, alternatively from 0 to 10; p is from 2 to 120, alternatively from 5 to 100, alternatively from 10 to 80; and q is from 2 to 4. In example embodiments, the silicone-polyether block copolymers may contain per molecule an average of at least one group $R^5$ for which $R^5$ is $R^4$.

In every instance, groups $R^1$ and $R^2$ comprise main hydrocarbon chains of 1 to 10 carbon atoms. The main chains are free of aliphatic unsaturation but may further comprise monovalent functional groups including, but not limited to, hydrocarbon groups or halogenated hydrocarbon groups, all of which themselves are free of aliphatic unsaturation. Such monovalent groups may have from 1 to 10 carbon atoms, alternatively 1 to 6 carbon atoms. The monovalent groups are exemplified without limitation by alkyl groups such as methyl, ethyl, propyl, butyl, pentyl, hexyl, heptyl, octyl, nonyl, and decyl; cycloalkyl groups such as cyclohexyl; aryl groups such as phenyl, tolyl, xylyl, benzyl, and 2-phenylethyl; and halogenated hydrocarbon groups such as 3,3,3-trifluoropropyl, 3-chloropropyl, and dichlorophenyl.

As a means of visualizing the basic structure of the molecules of formula (I), the silicone-polyether block copolymers can be represented using a shorthand notation such as $R^4B'\{[AB]_nAB'\}_hOSiR^1_2R^4$, wherein A represents —$R^2O(C_qH_{2q}O)_pR^2$—, B represents —$R^1_2Si(OR^5_2Si)_k$—, and B' represents —$R^1_2Si(OR^5_2Si)_m$—, with $R^1$-$R^5$, h, k, m, n, p, and q defined as above. Thus, the silicone-polyether block copolymer can be described in terms of a core $(AB)_h$ structure, wherein the $(AB)_h$ structure comprises polyether block A and silicone block B. The subscript h represents the average number of repeating units (AB) in the silicone-polyether block copolymer. In the silicone-polyether block copolymers of the embodiments described herein, h≥1. Alternatively, h ranges from 1 to 100, from 1 to 30, or from 1 to 10.

Both ends of the silicone-polyether block copolymer comprise an organosiloxane functionalized by an amine group $R^4$, referred to herein as a "terminal amine group." Group $R^4$ is defined as a monovalent amine —$R^2$—$NR^3_2$ or —$R^2$—$NR^3$—$R^2$—$NR^3_2$, wherein $R^2$ represents a $C_{1-10}$ hydrocarbylene group, as described above. Group $R^3$ may be a $C_{1-10}$ hydrocarbyl group ($R^1$) or a hydrogen atom.

In the $(AB)_h$ structure, polyether block A comprises at least one polyether. As used herein, "polyether" means a polyoxyalkylene group. The polyether may comprise, without limitation, structures of the formula —$(C_qH_{2q}O)_p$—, wherein q is from 2 to 4, and p is from 2 to 120, alternatively from 5 to 100, alternatively from 10 to 80. Thus, the polyether may comprise oxyethylene units (—$C_2H_4O$—), oxypropylene units (—$C_3H_6O$—), oxybutylene units (—$C_4H_8O$—), or combinations thereof. In example embodiments, the polyether may comprise oxyethylene units, oxypropylene units, or copolymers having both oxyethylene units and oxypropylene units.

Both ends of each polyether block A connect to the remainder of the molecule over a bridging $R^2$ group, which represents a $C_{1-10}$ hydrocarbylene, as described above.

Silicone block B in the $(AB)_h$ structure comprises groups —$R^1_2Si(OR^5_2Si)_k$—, which contain a diorganofunctional silylene linking group —$R^1_2Si$— and a diorganopolysiloxane repeating unit —$(OR^5_2Si)_k$—. Subscript k may range from 2 to 500, alternatively from 10 to 200, alternatively from 20 to 150. Within each diorganopolysiloxane unit of silicone block B, the diorganofunctional siloxane linking group comprises two hydrocarbyl groups $R^1$, defined as above. Group $R^5$ can be independently selected to represent either a hydrocarbyl group $R^1$ or an amine group $R^4$. As such, groups $R^5$ that are selected as amine groups $R^4$ make up the "pendent amine groups" within the silicone-polyether block copolymer.

In one embodiment, the silicone-polyether block copolymer comprises no pendent amines. In another embodiment, the silicone-polyether block copolymer comprises per molecule an average of at least one pendent amine group. In another embodiment, each molecule of the silicone-polyether block copolymer comprises both terminal amines and an average of at least one pendent amine group. The number of pendent amine groups or likewise, the molar fraction of monovalent silicon-bonded groups that are pendent amines in any given molecule depends on the statistics of amine incorporation during the chosen synthetic route, as will be described below. Thus, in another embodiment, the incorporation of pendent amines, as quantified in terms of weight percent of nitrogen per molecule, results in an average of about 0.1 wt. % to about 3 wt. % nitrogen present in each molecule of the silicone-polyether block copolymer.

In example embodiments, methods for synthesizing linear silicone-polyether block copolymers of the above formula (I) are provided. In some example embodiments, a silicone-polyether $(AB)_h$ block copolymer may be formed substantially via a condensation process alone or, in other example embodiments, via simultaneous condensation and equilibration processes, depending on the components of the reaction mixture. In particular, though in all mechanisms some level of condensation is present, equilibration is increasingly favored when cyclosiloxanes are used as raw materials. As the person of ordinary skill in the art will understand, condensation refers to the process of growing increasingly longer polymer chains through the joining of multiple molecular units and removal of a small molecule byproduct. In the present context, equilibration is a process that results in an essentially random distribution of pendent functional groups within the silicone-polyether block copolymer molecules being synthesized.

Without intent to be limited by theory, equilibration can be explained from the observation that, during the growth of polysiloxanes in a reaction mixture under certain conditions, an equilibrium is established in the reaction mixture between linear polysiloxanes and cyclosiloxanes. Whether the equilibrium favors the presence of linear polysiloxanes or of cyclosiloxanes depends at least in part on the functional groups attached to the diorganosilicon groups (also known as "D-units") present in the reactants (the "D-unit sources"). Equilibration conditions include catalysts that cause silicon-oxygen bonds to be cleaved in the reaction mixture, from both the cyclosiloxanes and the linear polysiloxanes. Unlike in condensation, wherein formation of a cyclosiloxane effectively would stop further lengthening of a polymer chain, in equilibration the cyclosiloxanes are constantly formed and broken. Also unlike condensation, wherein the polymer chain progressively grows as monomer units are added to the chain, under equilibration conditions, the continuous cleavage and re-formation of silicon-oxygen bonds effects a constant reshuffling of the D-units in the polymer. If multiple D-unit sources (for example, one comprising an amine group and another lacking an amine group) are present in the reaction mixture, after time the constant rearrangement during equilibration causes an effectively random incorporation of the multiple D-units along the polymer chain.

Further without intent to be limited by theory, if an endblocking agent is added to an equilibration reaction mixture, the most thermodynamically stable state of the equilibrium in the reaction mixture is reached when the linear polysiloxanes are of substantially the same molecular weight. Ultimately, the molecular rearrangements from silicon-oxygen bond cleavage continue until every molecule of polymer product is endblocked by two molecules of endblocking agent (i.e., one molecule on each of the two ends of the polymer chain). Following a simple stoichiometric relationship, the molecular weight of the species thus depends on the ratio of the moles of D-unit sources to moles of endblocking agent in the reaction mixture. It follows that a larger D-unit source to endblocking agent molar ratio results in longer polymer chains, and that a smaller ratio results in shorter polymer chains. Thus, if only one type of D-unit source is present in the reaction mixture, the D-unit source to endblocking agent molar ratio is directly proportional to the molecular weight of the polymer chains. But when multiple D-unit sources of different molecular weights are present in the equilibration reaction mixture, for the polymer chains all to have substantially the same molecular weight, the polymer chains necessarily must have a statistical distribution of lengths. The distribution of lengths is directly attributable to the random incorporation of each type of D-unit that had been present in the reaction mixture. Thereby, observation of the distribution of lengths may be used to quantify the extent of random D-unit incorporation such as, for example, when pendent amines are randomly incorporated along the polymer chain.

In example embodiments, the method of preparing a silicone-polyether block copolymer may comprise forming a reaction mixture by combining
(a) a polyether having the average formula (II):

$$ZR^1_2Si(OR^1_2Si)_m[R^2O(C_qH_{2q}O)_pR^2R^1_2Si(OR^1_2Si)_k]_nR^2O(C_qH_{2q}O)_pR^2R^1_2Si(OR^1_2Si)_mZ \quad (II);$$

(b) an organosilicon component selected from the group consisting of (i) at least one cyclosiloxane having the formula $(R^5_2SiO)_t$, (ii) at least one linear siloxane having the average formula $Z(R^5_2SiO)_vSiR^5_2Z$, (iii) at least one silane having the formula $R^5_2Si(OR^3)_2$, and (iv) an organosilicon mixture comprising at least two organosilicon components selected from (b)(i), (b)(ii), and (b)(iii), and (v) an organosilicon mixture comprising water and at least one organosilicon component selected from (b)(i), (b)(ii), and (b)(iii);
(c) an endblocking agent selected from (i) at least one sila-aza-cyclopentane having the formula (ii) at least one silane having the formula $R^4R^5_2Si(OR^3)$, (iii) at least one siloxane having the formula $R^4R^5_2SiO(R^5_2SiO)_wSiR^5_3$, and (iv) an endblocker mixture comprising at least two endblocking agents selected from (c)(i), (c)(ii), and (c)(iii); and
(d) at least one catalyst.

In the formulas above, $R^1$ is $C_1$-$C_{10}$ hydrocarbyl; $R^2$ is $C_1$-$C_{10}$ hydrocarbylene; $R^3$ is $R^1$ or H; $R^4$ is —$R^2$—$NR^3_2$ or —$R^2$—$NR^3$—$R^2$—$NR^3_2$; $R^5$ is $R^1$ or $R^4$; $R^6$ is —$CH_3$ or H; Z is hydroxyl or a hydrolysable group; m is from 2 to 500; n is from 0 to 30; p is from 2 to 50; q is from 2 to 4; t is from 3 to 8; v is from 1 to 50; and w is from 0 to 200. Furthermore, the mole ratio of the organosilicon component (b) to the polyether (a) may be from about 1.01 to about 2. In this context, the number of moles of organosilicon component (b) is equal to the sum of the numbers of moles of all compounds of type (b)(i), (b)(ii), and (b)(iii) present in the reaction mixture, without regard to water that may be present in organosilicon mixtures of type (b)(v). The mole ratio of the endblocking agent (c) to the polyether (a) may be from about 0.02 to about 2. Likewise, in this context, the number of moles of endblocking agent (c) is equal to the sum of the numbers of moles of all endblocking agents (c) of type (c)(i), (c)(ii), and (c)(iii) present in the reaction mixture.

It will be apparent that the forming of the reaction mixture may be accomplished in any prudent manner. In some embodiments, the reaction mixture may be formed by adding to a suitable reaction vessel components (a), (b), and (d) before adding endblocking agent (c). Without intent to be bound by theory, it is believed that adding the endblocking agent (c) last lessens the statistical likelihood of premature termination of the polymer. Premature termination results in the formation of unreactive, short siloxane chains before the growing polysiloxane can be incorporated into an (AB)$_h$ structure. Therefore, in further embodiments the viscosity of a mixture of components (a), (b), and (d) may be monitored until it reaches a desired value, whereupon the endblocking agent (c) may be added to the reaction mixture. However, when equilibration is targeted as the primary reaction mechanism, premature termination is of no concern, and the reaction mixture may be formed, for example, by mixing components (a)-(d) at one time.

Thereupon, the reaction mixture is heated at a temperature from 50° C. to 200° C., alternatively from 80° C. to 130° C., for a sufficient amount of time to produce a silicone-polyether block copolymer having a number-average molecular weight from 2000 to 500,000, provided the silicone-polyether block copolymer contains per molecule an average of at least one group $R^5$ for which $R^5$ is $R^4$. The sufficient amount of time, as applies to heating the reaction mixture, can be identified in various manners, depending on the specific reactants involved. For example, some reaction mixtures may change from opaque to clear as a visible indication that the initially incompatible siloxanes and polyethers (an opaque mixture) have formed polymer chains that act as compatibilizers to allow the mixture to become clear. Thus, in such circumstances a clear reaction mixture may indicate that the heating has occurred for a sufficient amount of time. On the other hand, some reaction mixtures may remain opaque through the entire reaction. In either case, a sufficient amount of time may be determined by monitoring the viscosity of the reaction mixture. In one non-limiting illustrative example, a sufficient amount of time has passed when an initial reaction mixture of viscosity 300 cP has increased to a predetermined value in the range 2000 cP to 10,000 cP. However, particularly when a condensation reaction is the primary mechanism, in consideration of the molar quantities of the reactants, the amount of water or alcohol being consumed by the reaction can be monitored and assessed to determine when the heating has occurred for a sufficient amount of time. Alternatively, the reaction may be tracked during heating by in-situ spectroscopic means such as, for example, NMR or IR. In non-limiting illustrative embodiments, the reaction mixture is heated from about 1 hour to about 8 hours, alternatively from about 1 hour to about 3 hours.

To facilitate visualization, the polyether (a) of formula (II) can be represented by an abbreviated formula such as ZQ' [AQ]$_n$AQ'Z, where A is —$R^2O(C_qH_{2q}O)_pR^2$—, Q is —$R^1{}_2Si(OR^1{}_2Si)_k$—, and Q' is —$R^1{}_2Si(OR^1{}_2Si)_m$—, with $R^1$, $R^2$, Z, k, m, n, p, and q defined as above. Endgroup Z may be hydroxyl or a hydrolysable group. Example hydrolysable groups include, but are not limited to groups such as alkoxyl, alkoxysilyl, hydridosilyl, acyloxysilyl, halosilyl, or silazanyl. Further examples of hydrolysable groups include —OMe (methoxyl), —OEt (ethoxyl), —OPr (propoxyl), —OAc (acetoxyl), —$NR^3{}_2$, —Cl, or —Br. If endgroup Z is —$NR^3{}_2$ or silazanyl, a nitrogen atom is hydrolyzed and is not attached to the polymer chain. Thus, the polyether (a) contains no amine functionalities.

In every instance, groups $R^1$ and $R^2$ comprise main hydrocarbon chains of 1 to 10 carbon atoms. The main chains are free of aliphatic unsaturation but may further comprise monovalent functional groups including, but not limited to, hydrocarbon groups or halogenated hydrocarbon groups, all of which themselves are free of aliphatic unsaturation. Such monovalent groups may have from 1 to 10 carbon atoms, alternatively from 1 to 6 carbon atoms. The monovalent groups are exemplified without limitation by alkyl groups such as methyl, ethyl, propyl, butyl, pentyl, hexyl, heptyl, octyl, nonyl, and decyl; cycloalkyl groups such as cyclohexyl; aryl groups such as phenyl, tolyl, xylyl, benzyl, and 2-phenylethyl; and halogenated hydrocarbon groups such as 3,3,3-trifluoropropyl, 3-chloropropyl, and dichlorophenyl.

The polyether (a) of general formula (II) may be synthesized from a polyether of general formula (III):

A-O(C$_q$H$_{2q}$O)$_p$-A, where p is from 2 to 120, alternatively from 5 to 100, alternatively from 10 to 80; q is from 2 to 4; and A represents a group having a terminal vinyl functionality such as, for example, allyl, methallyl, butenyl, pentenyl, or hexenyl. The polyether of formula (III) is hydrosilylated with an Si—H-functional compound or polymer such as ethoxydimethylsilane, tetramethyldisiloxane, alkoxydimethylsilane, or an Si—H-terminal polydimethylsiloxane to form a polyether of formula (II) as an intermediate. In some embodiments, reaction of an alkylhalosilane (for example, dimethylchlorosilane) with a diallyl-terminated or dimethallyl-terminated polyether of formula (III), followed by a dechlorination, may be used to form the polyether (a) of formula (II) as an intermediate. The dechlorination may comprise, for example, a hydrolysis reaction with water to form a silanol, an alcoholysis reaction with an alcohol to form an alkoxysilane, or an acylation reaction with an acyl anhydride (for example, acetic anhydride) to form an acyloxysilane (for example, acetoxysilane). Thus, in example embodiments, depending on the route to synthesize the polyether intermediate, the polyether (a) may be terminated with groups including, but not limited to, halosilanes, alkoxysilanes, acyloxysilanes, hydridosilanes, hydrido-terminal siloxanes, halo-terminal siloxanes, or silanols.

According to the present method, the polyether (a) of formula (II) is combined in a reaction mixture comprising an organosilicon component (b) and an endblocking agent (c). In such a reaction, the organosilicon component (b) provides a source for "D-units" within the silicone-polyether block copolymer. As used herein, the term "D-unit" refers to diorganofunctional siloxane groups not on the end of the silicone-polyether chain, wherein each silicon atom is connected or may be connected to two oxygen atoms.

The endblocking agent (c) controls the ultimate molecular weight of the silicone-polyether block copolymer. More precisely, the length of the resulting polymer chain depends on the ratio of the moles of the organosilicon component (b) (the "D-unit source") to the moles of endblocking agent (c). A higher D-unit to endblocking agent molar ratio, for example, produces a silicone-polyether block copolymer having a higher molecular weight. Both the endblocking agent (c) and the polyether (a) control the (AB)$_h$ structure. In particular, the absolute number of polymer chains that can be made is based on the number of moles of the endblocking agent (c) present in the reaction mixture. The ratio of the moles of the polyether (a) relative to the moles of endblocking agent (c) determines the value of h in the (AB)$_h$ unit being formed. As such, the overall molecular weight of the (AB)$_h$ unit is determined from the reaction of (h+1) parts of the organosilicon component (b) with h parts of the polyether (a) to form each (AB)$_h$ unit of the silicone-polyether block copolymer.

The organosilicon component (b) may comprise (i) at least one cyclosiloxane of the formula (R$^5{}_2$SiO)$_p$, (ii) at least one linear siloxane of the formula Z(R$^5{}_2$SiO)$_v$SiR$^5{}_2$Z, (iii) at least one silane of the formula R$^5{}_2$Si(OR$^3$)$_2$, (iv) an organosilicon mixture comprising at least two organosilicon components selected from (b)(i), (b)(ii), and (b)(iii), or (v) an organosilicon mixture comprising water and at least one organosilicon component selected from (b)(i), (b)(ii), and (b)(iii). Each of the foregoing organosilicon components comprises a group $R^5$, which may be defined as an amine functionality, among other options. The extent of pendent amine incorporation in the final silicone-polyether block copolymer depends in part on the number of $R^5$ groups in the organosilicon component (b) that are selected as an amine group $R^4$. The wide availability of choices for the organosilicon component (b) can lead to a large number of unique final structures.

Example organosilicon components (b) that incorporate non-amine "D-units" into the final silicone-polyether block copolymer include, but are not limited to cyclosiloxanes of type (b)(i) including dimethylcyclosiloxanes such as octamethylcyclotetrasiloxane and decamethylcyclopentasiloxane, methylphenylcyclosiloxanes, and diphenylcyclosiloxanes such as decaphenylcyclopentasiloxane; silanol-terminal linear polysiloxanes of type (b)(ii) such as polydimethylsiloxanes and polymethylphenylsiloxanes; silanes of type (b)(iii) such as diphenylsilanediol; and any combination of two or more of these.

Pendent amines can be incorporated into the polymer chain by choosing the organosilicon component (b) from molecules in the group including, but not limited to,

N-(2-aminoethyl)-3-aminopropylmethyldimethoxysilane

N-methyl-3-aminopropylmethyldimethoxysilane

N-ethylaminoisobutylmethyldiethoxysilane 3-aminopropylmethyldiethoxysilane and

N-(2-aminoethyl)-3-aminoisobutylmethyldimethoxysilane

Each of the foregoing organosilicon components comprises at least one group $R^5$ defined as $R^4$, according to the structures noted above.

In some embodiments, the organosilicon component may be an organosilicon mixture (b)(v) comprising water and at least one organosilicon component selected from organosilicon components of type (b)(i), (b)(ii), and (b)(iii). The water in such an organosilicon mixture may be added to the reaction mixture with polyether (a), other organosilicon components of types (b)(i), (b)(ii), and (b)(iii), and catalyst (d) before the endblocking agent (c) is added. Without intent to be limited by theory, it is believed that the water may aid formation of linear polymers when the reaction mixture otherwise would lack sufficient silanol groups, for example, particularly when the organosilicon component (b) comprises a cyclosiloxane of type (b)(i) as a source of D-units. Furthermore, when water is added to a reaction mixture comprising alkoxysilane groups, the water will hydrolyze the alkoxysilane groups into silanol groups and, thereby, will favor a much faster condensation reaction. In example embodiments, the water may be added in an amount sufficient to hydrolyze all terminal alkoxysilane groups on organosilicon compounds present in organosilicon component (b), so as to kinetically favor condensation of the organosilicon compounds onto the polyether (a).

The endblocking agent (c) may be selected from (i) sila-aza-cyclopentanes of the general formula from (ii) one or more silanes of the formula $R^4R^5_2Si(OR^3)$, from (iii) one or more siloxanes of the formula $R^4R^5_2SiO(R^4_2SiO)_wSiR^5_3$, or from (iv) endblocker mixtures comprising at least two endblocking agents selected from these. Each endblocking agent (c) comprises a group $R^4$, which is defined as an amine functionality ($—R^2—NR^3_2$ or $—R^2—NR^3—R^2—NR^3_2$). Example sila-aza-cyclopentane endblocking agents (c)(i) include without limitation N-methyl-aza-2,2,4-trimethylsilacyclopentane. Example silane endblocking agents (c)(ii) include without limitation N-(2-aminoethyl)-3-aminoisobutyldimethylmethoxysilane. Example siloxane endblocking agents (c)(iii) include without limitation bis(3-aminopropyl)-tetramethyldisiloxane.

Further examples of endblocking agents (c) according to the above general formulas include, but are not limited to, endblocking agents such as

N-methyl-aza-2,2,4-trimethylsilacyclopentane

N-aminoethyl-aza-2,2,4-trimethylsilacyclopentane

3-aminopropyldimethylethoxysilane

3-aminopropyldiisopropylethoxysilane

1-amino-2-(dimethylethoxylsilyl)propane aminoethylaminopropyldimethylethoxysilane

1,2-bis(3-aminopropyl)-tetramethyldisiloxane 3-aminopropylpentamethyldisiloxane and
1,2-bis(2-aminoethylaminomethyl)-tetramethyldisiloxane In a silicone-polyether block copolymer comprising an $(AB)_h$ unit formed from the reaction of (h+1) parts of the organosilicon component (b) D-unit source with h parts of the polyether (a) of formula (II), exactly two parts of endblocking agent (c) are required per molecule. In a reaction mixture, with $h \geq 1$, the mole ratio of the organosilicon component (b) to the polyether (a) is theoretically limited to the range of 1 to 2 and the mole ratio of the endblocking agent (c) to the polyether (a) is theoretically limited to the range of greater than zero to about 2. As described above, in example embodiments h may be from 1 to 100, alternatively from 1 to 30, alternatively from 1 to 10. Thus, in the same example embodiments, the mole ratio of the organosilicon component (b) to the polyether (a) in the reaction mixture may be from about 1.01 to about 2, alternatively from about 1.03 to about 2, alternatively from about 1.1 to about 2, respectively. Likewise, the mole ratio of the endblocking agent (c) to the polyether (a) in the reaction mixture may be from about 0.02 to about 2, alternatively from about 0.03 to about 2, alternatively from about 0.1 to about 2, respectively.

The reaction mixture may further include a catalytically effective amount of one or more catalysts (d). In example embodiments, the catalyst (d) may be selected from alkali compounds such as sodium hydroxide (NaOH) or potassium hydroxide (KOH). In further example embodiments, ammonium salts may be used as catalysts, including, for example, ammonium hydroxide (NH$_4$OH) or quaternary ammonium salts such as tetramethylammonium hydroxide (TMAH). In still further example embodiments, platinum complexes with siloxanes may be used. In still further example embodiments, metalorganic catalysts may be used to promote condensation. Example metalorganic catalysts include, but are not limited to, diisopropoxybis(2,4-pentanedionato)titanium (IV) ((Ti(OiPr)$_2$(acac)$_2$), titanium(2-ethylhexyloxide)$_4$, titanium (IV) isopropoxide (Ti(OiPr)$_4$), di-n-butyldiacetoxytin (Sn(n-C$_4$H$_9$)$_2$(OAc)$_2$), yttrium(2-ethylhexanoate)$_3$, nickel(2-ethylhexanoate)$_2$, copper(2-ethylhexanoate), calcium(2-ethylhexanoate)$_2$, and mixtures of any of these.

Figure 1:
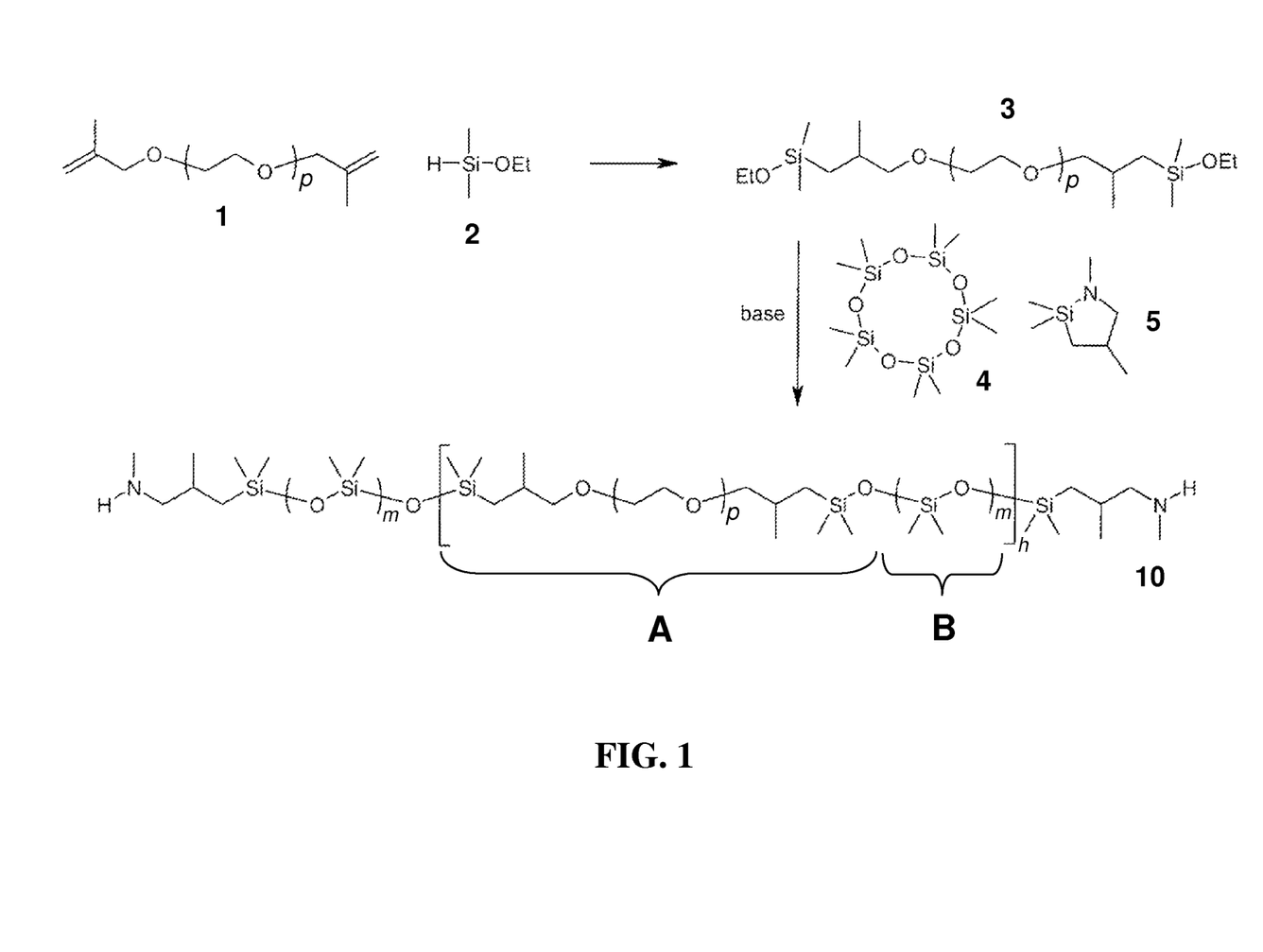
FIG. 1 depicts a reaction pathway for synthesizing silicone-polyether block copolymers according to embodiments disclosed herein.

Referring to FIG. 1, a non-limiting example embodiment of a method for synthesizing a silicone-polyether block copolymer of formula (I) above is depicted. Polyether intermediate 3 is synthesized from a reaction between methallyl-terminated polyether 1 and Si—H-functional compound 2 (shown as dimethylethoxysilane). Polyether intermediate 3 then is reacted with organosilicon component 4 (shown as decamethylcyclopentasiloxane, or (R$^5_2$SiO)$_t$ with R$^5$=methyl and t=5) and endblocking agent 5 (shown as N-methyl-aza-2,2,4-trimethylsilacyclopentane, a sila-aza-cyclopentane of the general formula depicted above, wherein both groups R$^1$ are methyl and groups $R^4$ and $R^6$ both are methyl). The resulting product is an amine-terminated $(AB)_n$ silicone-polyether block copolymer 10.

Figure 2:
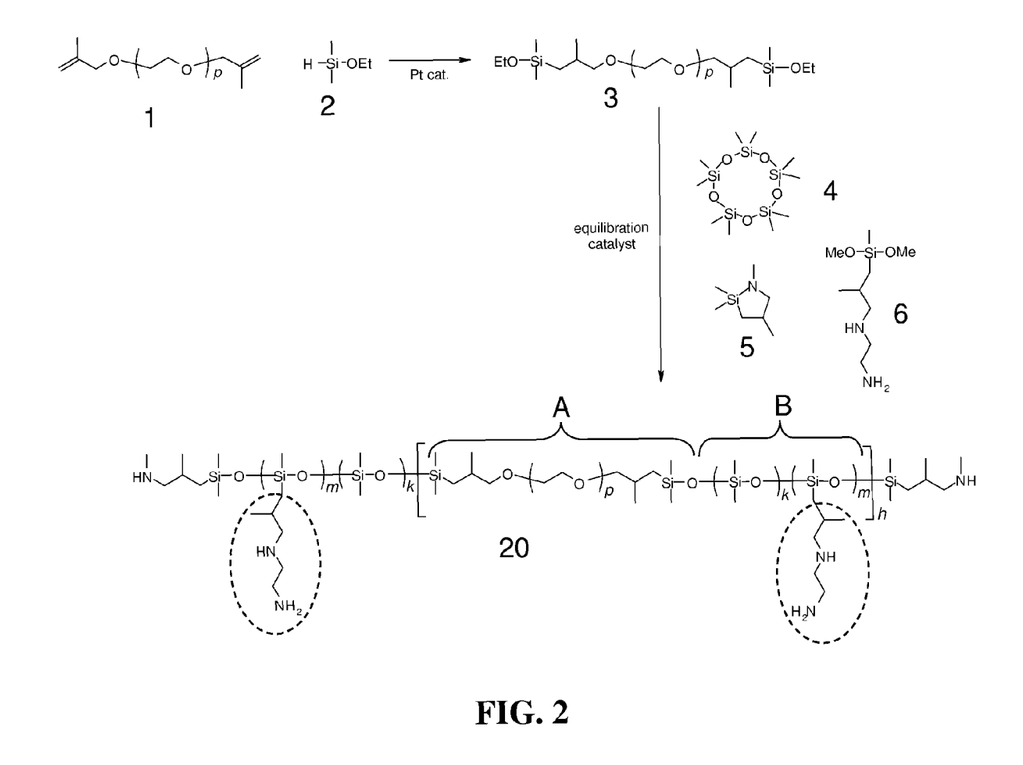
FIG. 2 depicts a reaction pathway for synthesizing silicone-polyether block copolymers with pendent amine functionalities, according to embodiments disclosed herein.

Referring to FIG. 2, a further non-limiting example synthetic method is schematically depicted. Polyether 1, Si—H-functional compound 2, polyether intermediate 3, and organosilicon component 4 are the same as in the method shown in FIG. 1. However, to the reaction mixture containing 3, 4, and 5 in an equilibration catalyst also is added pendent amine source 6 (shown as N-(2-aminoethyl)-3-aminoisobutyl-methyldimethoxysilane, a silane having the formula $R^5{}_2$ $Si(OR^3)_2$, wherein each $R^3$ is methyl and $R^5$ is in one instance methyl and in the other instance a group $R^4$, the group $R^4$ being selected as —$R^{2a}$—$NR^3$—$R^{2b}$—$NR^3{}_2$, wherein $R^{2a}$ is isobutylenyl (—$CH_2$—$CH(CH_3)$—$CH_2$—), $R^{2b}$ is ethylenyl (—$CH_2$—$CH_2$—), and each $R^3$ is hydrogen). The resulting product is an amine-terminated $(AB)_n$ silicone-polyether block copolymer 20 comprising pendent amine functional groups (circled) dangling from the siloxy groups having subscript m.

Advantageously, the synthetic route according to the embodiments of the method disclosed above does not require a solvent. In certain other methods involving hydrosilylation, solvent typically is added to improve product quality and to make compatible two otherwise incompatible polymers. In contrast, the first step of the present method involves simple hydrosilylation of a low molecular-weight intermediate onto a difunctional polyether. Because most low molecular-weight silane or siloxane intermediates already are compatible with such difunctional polyethers, a solvent is not required in the present method. Manufacturing efficiency and reduced waste-generation result from the avoidance of solvents. Additionally, the method according to embodiments disclosed above makes efficient use of expensive platinum catalyst. In a typical hydrosilylation, Pt is present in a 2-ppm range. Platinum consumption is decreased in the methods embodied above through the initial synthesis of the polyether intermediate, which then is used to synthesize the final product silicone-polyether block copolymer. Even minuscule conservation of platinum during synthesis can translate into significant cost savings for final products. In contrast, the materials made according to the disclosures of JP09183854, JP03269570, and WO 2008/127519 typically require full loading of Pt, thereby resulting in a more costly synthetic route.

The present method is particularly advantageous in that equilibration may occur concomitantly with condensation. In this sense, at the same time as the silicone-polyether block copolymer chain is growing, amine functionalities can incorporate statistically, depending on the contents of the reaction mixture. It would be undesirable for the initial siloxane block size to be determined necessarily by an independent hydrosilylation step with a Si—H-terminal siloxane. Such a method would require precise control of the ratio of reactants used to establish the initial molecular weight of the first block-copolymer intermediate, and then the reactants would need to be fed into a separate equilibration step. In a one-step method according to embodiments described herein, however, excess Si—H may be used. As such, tight control of reactants is not required. The excess reagent can be stripped off, or in some cases can be reintroduced into the system during an optional second equilibration step. In a second or further equilibration step, for example, the polymer can be reworked by making up the deficient component and subjecting the batch to equilibration. A reworking of this nature cannot be accomplished effectively in the process disclosed in JP09183854 and JP03269570, and is impossible in the process disclosed in WO 2008/127519, because an —OH group near the end of the polymer can condense and promote gelling so as to render the reaction essentially irreversible.

The present method for synthesizing amine-terminal $(AB)_n$ materials advantageously does not require an epoxide compound in the synthesis. In epoxide routes for synthesizing amine-terminal polymers, an epoxy functionality is incorporated onto the polymer chain via hydrosilylation with an unsaturated epoxide such as allyl glycidyl ether or vinylcyclohexene oxide. Additional isomerization or hydrogenation of the double bond in the epoxide has the potential to lead to residual epoxides that can subject products to additional health, environmental, or safety regulations. Accordingly, further embodiments are directed to silicone-polyether block copolymers prepared by any of the methods disclosed and embodied herein.

The above embodiments demonstrate that chain-end primary-amine or secondary-amine functionality permits simple derivatization. Conceivably, the polymer chain could be extended using diepoxy-functional molecules or polymers to form high molecular-weight polymers. Likewise, diisocyanates could be used to extend the chain and form a polymer with higher molecular weight.

EXAMPLES

The present invention will be better understood by reference to the following examples, which are offered by way of illustration and which one of skill in the art will recognize are not meant to be limiting.

Abbreviations for certain compositions are used in the following Examples, wherein:

EO=an ethylene-oxide unit (—$CH_2$—$CH_2$—O—);
PO=a propylene-oxide unit (—$CH_2$—$CH(CH_3)$—O—);
POLYETHER 1=a bis-methallyl terminated polyether, MW=743 g/mol, having the average formula $H_2C$=$C(CH_3)$ $CH_2O(EO)_{14}CH_2C(CH_3)$=$CH_2$;
POLYETHER 2=a bis-allyl terminated polyether, MW=979 g/mol, having the average formula $H_2C$=$CHCH_2$ $O(EO)_{20}CH_2CH$=$CH_2$;
POLYETHER 3=a bis-allyl terminated polyether, MW=1086 g/mol, having the average formula $H_2C$=$CHCH_2$ $O(PO)_{17}CH_2CH$=$CH_2$;
POLYETHER 4=a bis-methallyl terminated polyether, MW=3228 g/mol, having the average formula $H_2C$=$C(CH_3)$ $CH_2O(EO)_{17}(PO)_{39}CH_2C(CH_3)$=$CH_2$;
Pt CATALYST 1=a solution of Pt-divinyltetramethyldisiloxane complex in isopropanol containing 0.33 wt. % Pt;
Pt CATALYST 2=a solution of Pt-divinyltetramethyldisiloxane complex in divinyltetramethyldisiloxane containing 26 wt. % Pt; and
CYCLOSILAZANE=N-methyl-aza-2,2,4-trimethylsilacyclopentane.

Example 1

Preparation of α,ω-bis[dimethylhydridosiloxydimethylisobutylsilyl]poly(ethylene oxide) from α,ω-dimethallylpoly(ethylene oxide)

To a flask were added 72.10 g of POLYETHER 1 and 1.0974 g of Pt CATALYST 1. The headspace was purged with nitrogen, and the mixture was heated to 70° C. To this mixture, 27.91 g of tetramethyldisiloxane (HSi(CH$_3$)$_2$ OSi(CH$_3$)$_2$H) was slowly added over an hour. A slight exotherm was initially observed, and then the temperature decreased. The temperature of the reaction vessel was maintained at 70° C. during the time of addition. The temperature was then ramped slowly in 10° C. increments to 120° C., at which it was held four hours to drive the reaction to completion. $^{13}$C NMR indicated that only a trace of methallyl functionality remained. $^{29}$Si NMR indicated that, rather than a simple endblocked polyether, some chain extension did occur to result in an (AB)$_h$ structure having h~1.5.

Example 2

Preparation of α,ω-bis[dimethylhydridosiloxydimethylpropylsilyl]poly(ethylene oxide) from α,ω-diallylpoly(ethylene oxide)

To a flask were added 84.02 g of POLYETHER 2 and 0.7168 g of Pt CATALYST 1. The mixture was heated to 65° C. while the headspace was purged with nitrogen. To the mixture was slowly added 16.21 g of tetramethyldisiloxane (HSi(CH$_3$)$_2$OSi(CH$_3$)$_2$H). An exotherm of about 5° C. was observed, which subsided once about 10% of the Si—H compound was added. The temperature was held at 70° C. during the remainder of the addition. The temperature then was raised by 10° C. increments to 100° C., at which the mixture was allowed to heat for four hours. $^{13}$C NMR indicated that the residual allyl-functionality was minor and was a result of isomerized double bonds. The target structure for this product was an (AB)$_h$-type polymer with h=3. $^{29}$Si NMR indicated that the resulting (AB)$_h$ structure was h~3.2.

Example 3

Preparation of α,ω-bis[dimethylisobutylethoxysilyl]poly(ethylene oxide) from α,ω-dimethallylpoly(ethylene oxide)

To a flask were added 50.05 g of POLYETHER 1, 0.2395 g of Pt CATALYST 1, and 17.03 g of ethyl acetate. The headspace was purged with nitrogen, and the mixture was heated to 60° C. To this mixture, 15.33 g of dimethylethoxysilane (CH$_3$CH$_2$O(CH$_3$)$_2$SiH) was slowly added at 1 drop every 2 seconds. An initial exotherm of 8° C. was observed. The temperature was held at 70° C. during this time. Once the addition was complete, the temperature was increased slowly to 82° C. and held for six hours. $^{13}$C NMR indicated that only a trace of methallyl functionality remained.

Example 4

Preparation of α,ω-bis[dimethylhydridosiloxydimethylisobutylsilyl]poly(ethylene oxide-co-propylene oxide) from α,ω-dimethallylpoly(ethylene oxide-co-propylene oxide)

To a flask were added 200.0 g of POLYETHER 4 and 0.9574 g of Pt CATALYST 1. The mixture was heated to 100° C. while the headspace was purged with nitrogen. To the mixture was added 18.50 g of tetramethyldisiloxane (HSi(CH$_3$)$_2$OSi(CH$_3$)$_2$H) dropwise over 15 minutes, and the mixture was heated for three hours. $^1$H NMR analysis indicated that some methallyl remained. An additional 5.11 g of tetramethyldisiloxane and 0.379 g of Pt CATALYST 1 were added, and the reaction mixture was heated for an additional 6 hours at 100° C. $^1$H NMR then indicated that the reaction was complete.

Example 5

Preparation of α,ω-bis[dimethylpropylchlorosilyl]poly(propylene oxide) from α,ω-diallylpoly(propylene oxide)

To a flask were added 289.5 g of POLYETHER 3 and 0.0308 g of Pt CATALYST 2. The mixture was heated to 100° C. while the headspace was purged with a mixture of 98% nitrogen and 2% oxygen. To the mixture was added 52.06 g of dimethylchlorosilane ((CH$_3$)$_2$ClSiH) dropwise over 1.5 hours. After three hours of heating at 100, a sample was taken for analysis by $^1$H NMR to confirm that all of the allyl functionality had been consumed. Volatiles were removed in vacuo.

Example 6

Preparation of α,ω-bis[acetoxydimethylpropylsilyl]poly(propylene oxide) from α,ω-bis[dimethylpropylchlorosilyl]poly(propylene oxide)

To a flask were added 183.0 g of the product of Example 5 and 36.74 g of acetic anhydride. The mixture was heated at 70° C. for 4 hours and acetylchloride was distilled off with the aid of a slow flow of nitrogen over the reaction mixture. Analysis of the mixture by $^1$H NMR showed incomplete conversion of the chlorosilane functionality to acetoxysilane. As a result, an additional 52.78 g of acetic anhydride was added and the mixture was heated at 100° C. for 24 hours. Residual volatiles were removed in vacuo. Analyses by $^1$H NMR and $^{29}$Si NMR confirmed complete conversion.

Example 7

Preparation of α,ω-bis[dimethylhydridosiloxydimethylpropylsilyl]poly(propylene oxide) from α,ω-diallylpoly(propylene oxide)

To a flask were added 84.47 g of POLYETHER 3 and 0.1553 g of Pt CATALYST 1. The mixture was heated to 65° C., and the headspace was purged with nitrogen. To the reaction was added 15.73 g of tetramethyldisiloxane slowly over 45 minutes. A slight exotherm was observed, and after the exotherm subsided, the temperature was held at 70° C. during the time of addition. The temperature was then ramped slowly in 10° C. increments until reaching 100° C., at which it was allowed to remain for 4 hours. $^{29}$Si NMR indicated that the resulting (AB)$_h$ structure was h~3.6. $^{13}$C NMR indicated that only a trace of allyl functionality remained.

Example 8

Preparation of α,ω-bis[dimethylisobutylchlorosilyl]poly(ethylene oxide) from α,ω-dimethallylpoly(ethylene oxide)

To a flask were added 952.5 g of POLYETHER 1 and 0.1368 g of Pt CATALYST 2. The mixture was heated to 110° C., and the headspace was purged with a mixture of 98% nitrogen and 2% oxygen. To the reaction was added 270.1 g of dimethylchlorosilane slowly over 3 hours. Initial addition of the chlorosilane did result in an exotherm of about 3° C. Upon complete addition of the chlorosilane, the mixture was heated for an additional 2 hours at 110° C. Volatiles were removed in vacuo.

Example 9

Preparation of α,ω-bis[dimethylisobutylmethoxysilyl]poly(ethylene oxide) from α,ω-bis[dimethylisobutylchlorosilyl]poly(ethylene oxide)

To the product from Example 8 was added 379.4 g of trimethylorthoformate and the mixture was heated at 60° C. for four hours with a slow flow of nitrogen to carry over the methylchloride and methylformate byproducts. Due to slow conversion and trimethylorthoformate being lost, and additional 120.4 g of trimethylorthoformate was added followed by heating at 60° C. for an additional four hours. A small amount of chlorosilane functionality remained, whereupon an additional 49.72 g of trimethylorthoformate was added and the reaction mixture was heated at 50° C. for an additional 8 hours. Unreacted components and byproducts were removed in vacuo. Analysis with $^1$H NMR confirmed complete conversion of the chlorosilane functionality to methoxysilane.

Example 10

Preparation of an amine-terminated $(AB)_h$ silicone-polyether block copolymer composed of polydimethylsiloxane and poly(ethylene oxide) blocks To a flask were added 284.5 g of cyclodimethylsiloxanes, 129.3 g of the product from Example 2, 1.22 g of CYCLOSILAZANE, and 0.27 g of tetramethylammonium hydroxide in 15.1 g of water. The headspace was purged with nitrogen, and the mixture was allowed to heat at 60° C. for one hour. The temperature was then increased to 110° C. under a sweeping flow of nitrogen for four hours. The mixture was heated at 130° C. for 30 minutes followed by heating at 180° C. for four hours under a nitrogen flow to decompose the catalyst and then vacuum stripped at 120° C. Molecular weight analysis (GPC, THF, polystyrene standards) indicated a polymer with a $M_N$=12,600 g/mol, $M_W$=50,300 g/mol, and PDI=3.99. $^{29}$Si NMR analysis was inconclusive as to the value of h in the resulting $(AB)_h$ structure. End group analysis via amine titration indicated that $M_N$=83,300 g/mol. Viscosity was measured by the cone and plate method to yield a value of 42,000 cP.

Example 11

Preparation of an amine-terminated $(AB)_h$ silicone-polyether block copolymer composed of polydimethylsiloxane and poly(ethylene oxide) blocks To a flask were added 136.8 g of polydimethylsiloxanediol (DP=11.7, MW=885.6 g/mol), 12.63 g of the product from Example 3, 1.80 g of CYCLOSILAZANE, and 0.17 g of tetramethylammonium hydroxide. The headspace was purged with nitrogen, and the mixture was allowed to heat at 50° C. for two hours. The temperature was then increased to 115° C. under a sweeping flow of nitrogen for four hours. The mixture was then heated at 180° C. under a nitrogen flow to decompose the catalyst and was vacuum stripped at 120° C. $^{29}$Si NMR indicated that the resulting $(AB)_h$ structure was h=2.0 with 93 dimethylsiloxane units in each silicone block. Molecular weight analysis (GPC, THF, polystyrene standards) indicated a polymer of $M_N$=14,300 g/mol, $M_W$=138,000 g/mol, and PDI=9.65. Viscosity for the polymer by the cone-and-plate method was 17,900 cP.

Example 12

Preparation of an amine-terminated $(AB)_h$ silicone-polyether block copolymer composed of polydimethylsiloxane and poly(ethylene oxide) blocks To a flask were added 78.79 g of polydimethylsiloxanediol (DP=11.7, MW=885.6 g/mol), 22.0 g of the product from Example 3, 0.64 g of CYCLOSILAZANE, 0.11 g of tetramethylammonium hydroxide. The headspace was purged with nitrogen, and the mixture was allowed to heat at 50° C. for 3.5 hours. The temperature was then increased to 115° C. under a sweeping flow of nitrogen for four hours. The mixture was heated at 180° C. for four hours under a nitrogen flow to decompose the catalyst and then vacuum stripped at 120° C. Molecular weight analysis (GPC, THF, polystyrene standards) indicated a polymer with a $M_N$=14,900 g/mol, $M_W$=82,300 g/mol, and PDI=5.52. $^{29}$Si NMR indicated that the resulting $(AB)_h$ structure was h=7.8, with 43.4 dimethylsiloxane repeat units in each silicone block.

Example 13

Preparation of an amine-terminated $(AB)_h$ silicone-polyether block copolymer composed of polymethylphenylsiloxane, polydiphenylsiloxane, and poly(ethylene oxide) blocks To a flask were added 52.64 g of octaphenylcyclotetrasiloxane, 36.65 g of methylphenyl cyclosiloxanes, 11.42 g of the product from Example 3, 1.74 g of CYCLOSILAZANE, 3.01 g of water, and 0.13 g of tetramethylammonium hydroxide. The headspace was purged with nitrogen, and the mixture was allowed to heat at 50° C. for four hours. The temperature was then increased to 115° C. under a sweeping flow of nitrogen for four hours. The mixture was then heated at 180° C. under a nitrogen flow to decompose the catalyst and was vacuum stripped at 200° C. Molecular weight analysis (GPC, THF, polystyrene standards) indicated a polymer with a bimodal distribution of $M_N$=6600 g/mol, 490 g/mol; $M_W$=12,900 g/mol, 510 g/mol; and PDI=1.94, 1.03. Viscosity for the polymer by the cone-and-plate method was 176,000 cP.

Example 14

Preparation of an amine-terminated $(AB)_h$ silicone-polyether block copolymer composed of polydimethylsiloxane and poly(ethylene oxide-co-propylene oxide) blocks To a flask were added 212.2 g of cyclodimethylsiloxanes, 129.3 g of the product from Example 4, 0.37 g of CYCLOSILAZANE, and 0.649 g of tetramethylammonium hydroxide in 6.68 g of water. The headspace was purged with nitrogen, and the mixture was allowed to heat at 50° C. for one hour. The temperature was then increased to 110° C. under a sweeping flow of nitrogen for four hours. The mixture was heated at 180° C. for four hours under a nitrogen flow to decompose the catalyst and then vacuum stripped at 120° C. Molecular weight analysis (GPC, THF, polystyrene standards) indicated a polymer with a $M_N$=45,100 g/mol, $M_W$=115,000 g/mol, and PDI=2.55. $^{29}$Si NMR analysis was inconclusive as to the value of h in the resulting $(AB)_h$ structure. Endgroup analysis via amine titration indicated that $M_N$=246,000 g/mol. Viscosity was measured by the cone and plate method to yield a value of 180,000 cP.

Example 15

Preparation of an amine-terminated $(AB)_h$ silicone-polyether block copolymer composed of polydiphenylsiloxane and poly(propylene oxide) blocks To a flask were added 78.65 g of octaphenylcyclotetrasiloxane, 17.09 g of the product from Example 7, 3.70 g of CYCLOSILAZANE, 5.80 g of water, 0.54 g of tetramethylammonium hydroxide, and 25.92 g of toluene. A Dean-Stark trap was used to collect water that azeotroped from the reaction. The headspace was purged with nitrogen, and the mixture was allowed to heat at 50° C. for one hour. The temperature was then increased to 115° C. under a sweeping flow of nitrogen for four hours. The mixture was heated at 180° C. under a nitrogen flow to decompose the catalyst and then was vacuum stripped at 120° C. Molecular weight analysis (GPC. THF, polystyrene standards) indicated a polymer with a bimodal distribution of $M_N$=5000 g/mol, 530 g/mol; $M_W$=7300 g/mol, 600 g/mol; and PDI=1.46, 1.12. $^{29}$Si NMR indicated that the resulting $(AB)_h$ structure was h=2.39.

Example 16

Preparation of an amine-terminated $(AB)_h$ silicone-polyether block copolymer composed of polydimethylsiloxane and poly(propylene oxide) blocks To a flask were added 93.62 g of dimethylcyclosiloxanes, 6.60 g of the product from Example 7, 4.43 g of CYCLOSILAZANE, 5.42 g of water, and 0.048 g of tetramethylammonium hydroxide. The headspace was purged with nitrogen, and the mixture was allowed to heat at 60° C. for one hour. The temperature was then increased to 110° C. under a sweeping flow of nitrogen for four hours. The mixture was heated at 160° C. under a nitrogen flow to decompose the catalyst and then vacuum stripped at 120° C. Molecular weight analysis (GPC, THF, polystyrene standards) indicated a polymer with $M_N$=7900 g/mol, $M_W$=18,900 g/mol, and PDI=2.39. $^{29}$Si NMR indicated that the resulting $(AB)_h$ structure was h=0.52, with 18.8 dimethylsiloxane repeat units in each silicone block.

Example 17

Preparation of an amine-terminated $(AB)_h$ silicone-polyether block copolymer composed of polyphenylmethylsiloxane and poly(ethylene oxide) blocks To a flask were added 61.49 g of α,ω-bis(hydroxymethylphenylsiloxy)-oligo(phenylmethylsiloxane), 27.54 g of the product from Example 9, 41.10 g of toluene, and 0.50 mL of tetrakis(2-ethylhexyl)orthotitanate. Upon mixing, 3.38 g of CYCLOSILAZANE was added, and the mixture was heated at reflux for 8 hours. Approximately 2.5 mL of water were collected in a Dean-Stark trap indicated condensation of the components to form a higher molecular weight polymer occurred. Molecular weight analysis (GPC. THF, polystyrene standards) indicated a polymer with a bimodal distribution of $M_N$=3250 g/mol, 480 g/mol; $M_W$=4890 g/mol, 500 g/mol; and PDI=1.51, 1.04.

Example 18

Preparation of an amine-terminated $(AB)_h$ silicone-polyether block copolymer composed of polyphenylmethylsiloxane and poly(ethylene oxide) blocks To a flask were added 61.42 g of α,ω-bis(hydroxymethylphenylsiloxy)-oligo(phenylmethylsiloxane), 27.91 g of the product from Example 9, 39.80 g of toluene, and 0.43 g of barium hydroxide. Upon mixing, 3.59 g of CYCLOSILAZANE was added, and the mixture was heated at reflux for 8 hours. Approximately 2.8 mL of water were collected in a Dean-Stark trap indicated condensation of the components to form a higher molecular weight polymer occurred. Volatiles were removed in vacuo. Molecular weight analysis (GPC. THF, polystyrene standards) indicated a polymer with a bimodal distribution of $M_N$=4170 g/mol, 470 g/mol; $M_W$=7590 g/mol, 480 g/mol; and PDI=1.82, 1.04.

Example 19

Preparation of an amine-terminated $(AB)_h$ silicone-polyether block copolymer composed of poly(phenylmethylsiloxane-co-diphenylsiloxane) and poly(ethylene oxide) blocks To a flask were added 55.39 g of α,ω-bis(hydroxymethylphenylsiloxy)-oligo(phenylmethylsiloxane), 25.31 g of diphenylsilanediol, 8.29 g of the product from Example 9, 0.40 g of barium hydroxide, and 37.90 g of toluene. After the foregoing components were mixed, 1.22 g of CYCLOSILAZANE was added, and the resulting mixture was heated at reflux for 8 hours. Approximately 4.0 mL of water were collected in a Dean-Stark trap indicated condensation of the components to form a higher molecular weight polymer occurred. Volatiles were removed in vacuo. Molecular weight analysis (GPC. THF, polystyrene standards) indicated a polymer with a bimodal distribution of $M_N$=9640 g/mol, 520 g/mol; $M_W$=18,200 g/mol, 543 g/mol; and PDI=1.89, 1.04. Viscosity was measured by the cone and plate method to yield a value of 24,800 cP.

Example 20

Preparation of an amine-terminated $(AB)_h$ silicone-polyether block copolymer composed of poly(dimethylsiloxane), poly(ethylene oxide) blocks, and pendent amine groups To a flask were added 258.3 g of polydimethylsiloxane diol (DP=11.7, MW=885.6 g/mol), 36.64 g of the product from Example 3, 8.50 g of aminoethylaminoisobutyl-methyldimethoxysilane, 2.60 g of CYCLOSILAZANE, and 0.34 g of tetramethylammonium hydroxide. The components were mixed at 50° C. for two hours. The temperature was increased to 115° C. with a flow of nitrogen sweeping the headspace to aid in removal of condensates. The product was then heated at 160° C. for six hours followed by heating at 180° C. for two hours to decompose the catalyst. Volatiles were removed in vacuo. Molecular weight analysis (GPC. THF, polystyrene standards) indicated a polymer with $M_N$=25,200 g/mol; $M_W$=262,000 g/mol; and PDI=10.4.

What is claimed is:

1. A silicone-polyether block copolymer having the average formula:

wherein $R^1$ is $C_1$-$C_{10}$ hydrocarbyl; $R^2$ is $C_1$-$C_{10}$ hydrocarbylene; $R^3$ is $R^1$ or H; $R^4$ is —$R^2$—$NR^3_2$ or —$R^2$—$NR^3$—$R^2$—$NR^3_2$; $R^5$ is $R^1$ or $R^4$; h is from 1 to 100; k is from 2 to 500; m is from 2 to 500; n is from 0 to 30; p is from 2 to 120; and q is from 2 to 4; wherein the copolymer contains per molecule an average of at least one $R^5$ group for which $R^5$ is —$R^2$—$NR^3_2$ or —$R^2$—$NR^3$—$R^2$—$NR^3_2$.

2. The silicone-polyether block copolymer of claim 1, wherein the at least one $R^5$ group is a pendent amine selected from the group consisting of N-(2-aminoethyl)-3-aminopropyl, N-methyl-3-aminopropyl, N-ethylaminoisobutyl, 3-aminopropyl, and N-(2-aminoethyl)-3-aminoisobutyl.

3. The silicone-polyether block copolymer of claim 2, wherein the at least one $R^5$ group is N-(2-aminoethyl)-3-aminoisobutyl.

4. The silicone-polyether block copolymer of claim 3, wherein each terminal $R^4$ group is N-methyl-3-aminoisobutyl.

5. The silicone-polyether block copolymer of claim 1, wherein h is from 1 to 10.

6. The silicone-polyether block copolymer of claim 1, wherein each $R^1$ group is independently selected from the group consisting of methyl, ethyl, and phenyl.

7. A method of preparing a silicone-polyether block copolymer, the method comprising:
combining
(a) a polyether having the formula (b) an organosilicon component selected from the group consisting of
(i) at least one cyclosiloxane having the formula $(R^5_2SiO)_t$,
(ii) at least one linear siloxane having the formula $Z(R^5_2SiO)_v SiR^5_2 Z$,
(iii) at least one silane having the formula $R^5_2Si(OR^3)_2$,
(iv) an organosilicon mixture comprising at least two organosilicon components selected from (b)(i), (b)(ii), and (b)(iii), and
(v) an organosilicon mixture comprising water and at least one organosilicon component selected from (b)(i), (b)(ii), and (b)(iii);
(c) an endblocking agent selected from
(i) at least one sila-aza-cyclopentane having the formula (ii) at least one silane having the formula $R^4R^5_2Si(OR^3)$,
(iii) at least one siloxane having the formula $R^4R^5_2SiO(R^5_2SiO)_w SiR^5_3$, and (iv) an endblocker mixture comprising at least two endblocking agents selected from (c)(i), (c)(ii), and (c)(iii); and
(d) at least one catalyst
to form a reaction mixture, wherein $R^1$ is $C_1$-$C_{10}$ hydrocarbyl; $R^2$ is $C_1$-$C_{10}$ hydrocarbylene; $R^3$ is $R^1$ or H; $R^4$ is —$R^2$—$NR^3_2$ or —$R^2$—$NR^3$—$R^2$—$NR^3_2$; $R^5$ is $R^1$ or $R^4$; $R^6$ is —$CH_3$ or H; Z is hydroxyl or a hydrolysable group; m is from 2 to 500; n is from 0 to 30; p is from 2 to 50; q is from 2 to 4; t is from 3 to 8; v is from 1 to 50; w is from 0 to 200; the mole ratio of the organosilicon component (b) to the polyether (a) is from 1.01 to 2; and the mole ratio of the endblocking agent (c) to the polyether (a) is from 0.02 to 2; and
heating the reaction mixture at a temperature from 50° C. to 200° C. for a sufficient amount of time to produce a silicone-polyether copolymer having a number-average molecular weight from 2000 to 500,000, provided the silicone-polyether copolymer contains per molecule an average of at least one $R^5$ group for which $R^5$ is $R^4$.

8. The method of claim 7, wherein the organosilicon component is an organosilicon mixture comprising water and at least one first cyclosiloxane having the formula $(R^7_2SiO)_t$, wherein each $R^7$ is independently methyl or phenyl and t is 4 or 5.

9. The method of claim 8, wherein for the at least one first cyclosiloxane each $R^7$ is methyl and t is 5.

10. The method of claim 7, wherein the organosilicon component is selected from the group consisting of:
at least one silane having the formula $R^8_2Si(OR^3)_2$, wherein $R^8$ is $R^5$ and at least one group $R^8$ is selected from the group consisting of N-(2-aminoethyl)-3-aminopropyl, N-methyl-3-aminopropyl, N-ethylaminoisobutyl, 3-aminopropyl, and N-(2-aminoethyl)-3-aminoisobutyl; and
an organosilicon mixture comprising at least one of the preceding silanes.

11. The method of claim 10, wherein at least one group $R^8$ is N-(2-aminoethyl)-3-aminoisobutyl and each $R^3$ is independently methyl or ethyl.

12. The method of claim 7, wherein the organosilicon component is an organosilicon mixture comprising:
at least one cyclosiloxane having the formula $(R^7_2SiO)_t$, wherein each $R^7$ is independently methyl or phenyl and t is 4 or 5;
water; and
at least one silane having the formula $R^8_2Si(OR^3)_2$, wherein $R^8$ is $R^5$ and at least one group $R^8$ is selected from the group consisting of N-(2-aminoethyl)-3-aminopropyl, N-methyl-3-aminopropyl, N-ethylaminoisobutyl, 3-aminopropyl, and N-(2-aminoethyl)-3-aminoisobutyl.

13. The method of claim 7, wherein the endblocking agent is selected from:
N-methyl-aza-2,2,4-trimethylsilacyclopentane;
N-aminoethyl-aza-2,2,4-trimethylsilacyclopentane;
3-aminopropyldimethylethoxysilane;
3-aminopropyldiisopropylethoxysilane;
1-amino-2-(dimethylethoxysilyl)propane;
aminoethylaminopropyldimethylethoxysilane;
1,2-bis(3-aminopropyl)-tetramethyldisiloxane;
3-aminopropylpentamethyldisiloxane;
1,2-bis(2-aminoethylaminomethyl)-tetramethyldisiloxane; and
an endblocker mixture comprising at least two of the preceding compounds.

14. The method of claim 13, wherein the organosilicon component is an organosilicon mixture comprising:
- at least one cyclosiloxane having the formula $(R^7{}_2SiO)_t$, wherein each $R^7$ is independently methyl or phenyl and t is 4 or 5;
- water; and
- at least one silane having the formula $R^8{}_2Si(OR^3)_2$, wherein $R^8$ is $R^5$ and at least one group $R^8$ is selected from the group consisting of N-(2-aminoethyl)-3-aminopropyl, N-methyl-3-aminopropyl, N-ethylaminoisobutyl, 3-aminopropyl, and N-(2-aminoethyl)-3-aminoisobutyl.

15. The method of claim 14, wherein the endblocking agent is
- a sila-aza-cyclopentane selected from N-methyl-aza-2,2,4-trimethylsilacyclopentane or N-aminoethyl-aza-2,2,4-trimethylsilacyclopentane; or
- an endblocker mixture comprising at least one of the preceding sila-aza-cyclopentanes.

16. The method of claim 7, wherein the catalyst is selected from the group consisting of alkali metal hydroxides, ammonium hydroxides, quaternary ammonium salts, and mixtures thereof.

17. The method of claim 7, wherein the catalyst comprises at least one metalorganic complex of a metal selected from the group consisting of platinum, titanium, tin, yttrium, nickel, copper, calcium, and combinations thereof.

18. A silicone-polyether block copolymer prepared by the method according to claim 7.

* * * * *